129,417

UNITED STATES PATENT OFFICE.

DELAPLAINE McDANIEL, WICKHAM B. SPEAR, AND JOSEPH W. RICHARDS, OF PHILADELPHIA, PENNSYLVANIA.

IMPROVEMENT IN METHODS OF UTILIZING WASTE TIN-SCRAP AND GALVANIZED IRON.

Specification forming part of Letters Patent No. 129,417, dated July 16, 1872.

Specification describing certain Improvements in a Combined Process for Utilizing Waste Materials, invented by DELAPLAINE McDANIEL, WICKHAM B. SPEAR, and JOSEPH W. RICHARDS, of the city of Philadelphia and State of Pennsylvania.

Our invention relates, in the first place, to the utilizing of waste galvanized iron or iron coated with zinc, and waste-tin clippings, combined by the removal of their coating by means of muriatic acid. It relates, in the second place, to the production of copper or graphite-coated iron from the iron subjected to the above process, and the manufacture of iron thus coated into other forms of wrought-iron by the usual processes known in the arts, the coating of the iron being for the purpose of preventing the oxidizing of the iron, and to improve its quality, by neutralizing the effects of any tin or zinc that may be amalgamated with the iron, which the acid in the first process has failed to remove. The third part of our invention relates to utilizing waste sal-ammoniac from galvanizing baths and the waste ammoniacal liquor from gas-works, together with the waste acid produced by the first process above described, for the manufacture of a flux to be used in coating iron with other metals. The fourth part of our invention relates to the production of the ordinary commercial green copperas from the waste solution of the protosulphate of copper, as hereinafter described.

Our modes of proceeding in the different processes are as follows: On the bottom of a suitable vessel for holding a certain amount of muriatic acid we place a coil of lead pipe, through which we pass steam for raising the temperature of the acid. We prefer using the acid of the usual commercial strength, yet it will answer if diluted with water. We place in the vessel with the acid a sufficient quantity of tinned-iron clippings to neutralize the acid. After the acid has removed the tin from the clippings we put them into a tank containing a solution of lime and leave them a sufficient length of time neutralize as much as possible the effects of any acid that may remain upon their surfaces, or that may have entered into the pores of the iron. They might further be cleaned from a portion of the acid by the use of clean water, which may be done by removing the iron to a tank and thoroughly washing the lime from it. We remove it then to another tank containing a solution of sulphate or chloride of copper, or a mixture of graphite and water, (the copper solution, however, is preferable,) and allow it to remain in the solution a few moments, and it becomes coated with metallic copper or graphite. This is done to prevent the iron oxidizing and to improve its quality by neutralizing the effects of any tin that may be amalgamated with it, which the acid by the first process has failed to remove. We remove the iron from the copper or graphite solution to a drying-room or furnace. After it has become dried it is fit to be worked by the usual processes into the different forms of manufactured iron. We then take waste scraps of galvanized iron, or any kind of zinc-coated iron and place them in the acid, which has ceased to act upon the tin-coated iron. The acid acts violently upon the zinc, speedily dissolving it from the iron. This iron when free from the zinc coating is treated in the same manner as the iron recovered after the tin coating has been removed, as above described. Then we take the acid and add waste sal-ammoniac skimmings produced by the process of galvanizing iron, and add to it a chemical equivalent of waste ammoniacal liquor from gas-works or other similar sources. This liquor we allow to settle, and then pass through it sulphureted-hydrogen gas for a sufficient time to precipitate the iron that may have been dissolved in it, or add to the solution a small quantity of carbonate of soda, which will answer the same purpose by precipitating the iron. We allow the liquor to settle again and then run off the clear liquor, from which we evaporate the water until the liquor is strong enough to crystallize. The liquor is then conveyed to a cooling or crystallizing tank, where a substance is produced which we use as a substitute for sal-ammoniac, and which is used as a flux on zinc or other metallic baths for coating iron or other metals.

These salts are superior to the ordinary flux of sal-ammoniac which is now used in galvanizing or coating iron or other metals with zinc, tin, or copper. We utilize the waste solution of the sulphate of copper by continual immersion of the iron scraps therein, whereby it becomes changed to a solution of the protosulphate of iron, from which we evaporate the water until it is of sufficient strength to crystallize, forming ordinary commercial green copperas.

We claim as our invention—

1. The combined use of waste galvanized iron or iron coated with zinc and waste tinned-iron clippings, substantially as described.

2. The production of copper or graphite-coated iron, substantially in the manner described, and the manufacture of iron thus coated into other forms of wrought-iron by the usual process known in the arts.

3. The utilizing of waste sal-ammoniac from galvanizing-baths and the waste ammoniacal liquor from gas-works, together with the waste acid produced by the first process for the manufacture of a flux, to be used for coating iron with other metals.

4. The production of ordinary commercial green copperas by the utilizing of the waste solution of protosulphate of copper, as above specified.

DELAPLAINE McDANIEL.
WICKHAM B. SPEAR.
JOSEPH W. RICHARDS.

Witnesses:
THOMAS J. BEWLEY,
STEPHEN USTICK.